United States Patent [19]
Ohishi et al.

[11] Patent Number: 5,482,016
[45] Date of Patent: Jan. 9, 1996

[54] PILOT INJECTION CONTROL SYSTEM

[75] Inventors: Takashi Ohishi; Hiroshi Ishiwata; Nobuhiro Kitahara, all of Saitama, Japan

[73] Assignee: Zexel Corporation, Japan

[21] Appl. No.: 296,708

[22] Filed: Aug. 26, 1994

[30] Foreign Application Priority Data

Sep. 9, 1993 [JP] Japan ................................. 5-247277

[51] Int. Cl.$^6$ .................................................. F02B 3/00
[52] U.S. Cl. .................................................. 123/299
[58] Field of Search ............................ 123/299, 295, 123/304

[56] References Cited

U.S. PATENT DOCUMENTS

| | | | |
|---|---|---|---|
| 5,078,107 | 1/1992 | Morikawa | 123/295 |
| 5,090,379 | 2/1992 | Ito | 123/299 |
| 5,140,959 | 8/1992 | Durbin | 123/304 |
| 5,199,398 | 4/1993 | Nylund | 123/299 |
| 5,231,962 | 8/1993 | Osuka et al. | 123/299 |
| 5,261,366 | 11/1993 | Reguerio | 123/299 |

FOREIGN PATENT DOCUMENTS

| | | | |
|---|---|---|---|
| 0018156 | 1/1988 | Japan | 123/299 |
| 0175438 | 6/1992 | Japan | 123/299 |

*Primary Examiner*—Raymond A. Nelli
*Attorney, Agent, or Firm*—Ostrolenk, Faber, Gerb & Soffen

[57] ABSTRACT

A pilot injection control system for an internal combustion engine comprises a plurality of fuel injection nozzles, the valve-opening pressure of one of which (the reference nozzle) is set slightly higher than that of the other nozzles, means for detecting the pilot injection of the reference nozzle, and means for feedback controlling the pilot injection quantity of the reference nozzle based on the detected pilot injection. The system is able to effectively control the pilot injection of all nozzles by actually controlling the pilot injection of only one nozzle and can therefore be implemented at low cost.

14 Claims, 6 Drawing Sheets

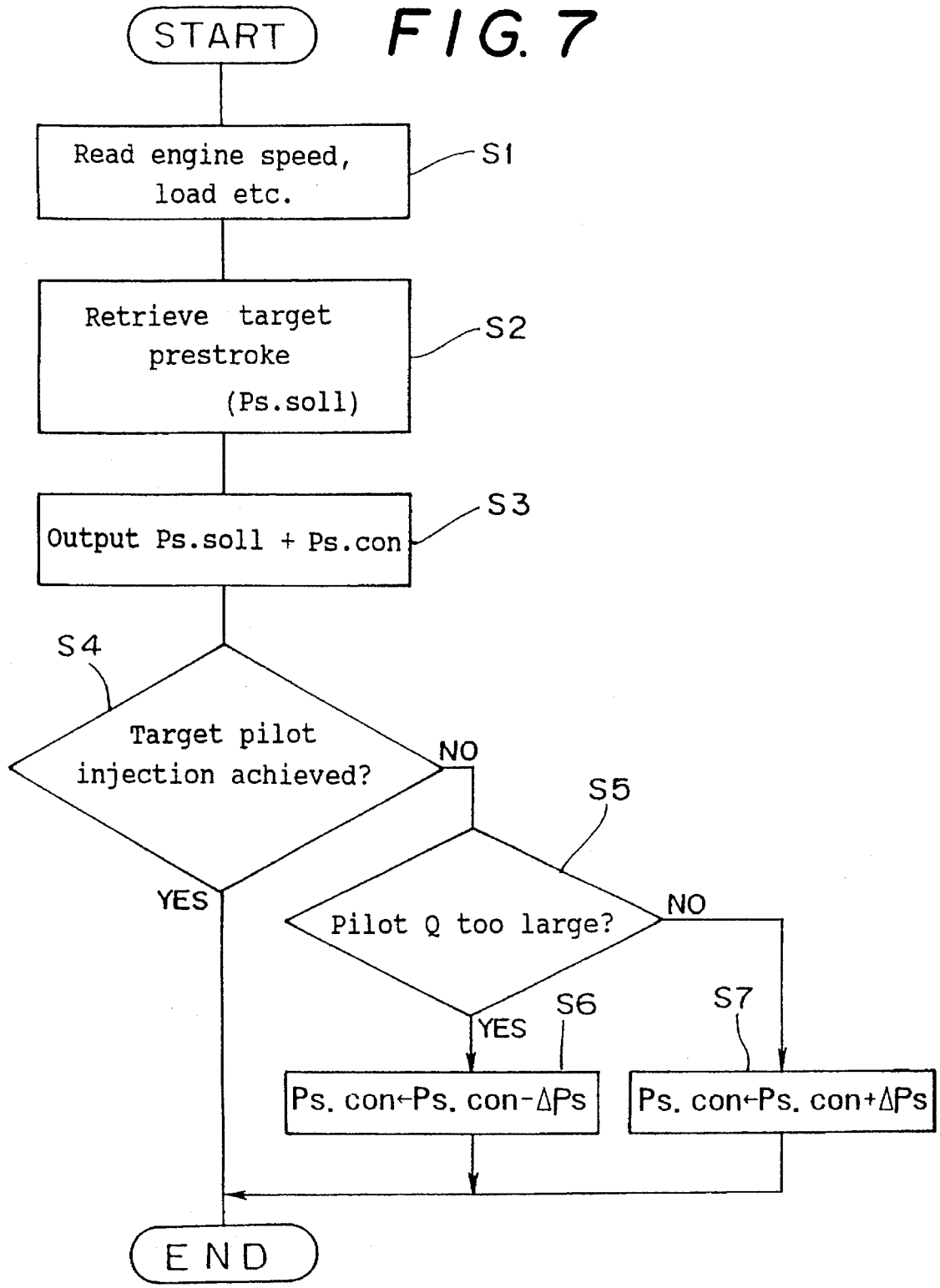

PILOT INJECTION CONTROL SYSTEM

BACKGROUND OF THE INVENTION

1. Field of the Invention

This invention relates to a pilot injection control system and more particularly to a pilot injection control system capable of monitoring the pilot injection state of an injection nozzle and utilizing the monitored state to ensure stable pilot injection.

2. Prior Art Statement

In diesel engines it is a common practice to divide the fuel injection into a pilot injection (initial injection) stage and an ensuing main injection stage so as to reduce ignition delay, prevent generation of oxides of nitrogen and lower combustion noise.

Pilot injection control is difficult, however, because the quantity of fuel injected in each diesel engine cylinder during pilot injection is required to be regulated to an extremely small value on the order of, for example, 5 mm³/stroke and, moreover, the injection quantity is highly sensitive to the valve-opening pressure of the fuel injection nozzle.

As taught in Japanese Patent Public Disclosures Sho 63-18156 and Hei 4-175438, for example, it has therefore been proposed to provide means for detecting the presence/absence or the quantity of pilot injection by the fuel injection nozzle and to feedback control the pilot injection based on the result of the detection. However, this method requires every fuel injection nozzle or every cylinder equipped with a fuel injection nozzle to be provided with a sensor for detecting the pilot injection state. It thus results in a complex and expensive control system.

This invention was completed in the light of the foregoing problem and has as its object to provide a pilot injection control system capable of ensuring stable pilot injection with a simple control system.

SUMMARY OF THE INVENTION

The inventors discovered (a) that in pilot injection some degree of degradation in fuel injection quantity control can be tolerated insofar as the injection quantity stays within a certain range, (b) that where the ideal pilot injection quantity per cylinder is 5 mm³/stroke, for example, combustion is little affected by either repeated or simple variance from this value insofar as the pilot injection quantity stays within the range of around 1 to 8 mm³/stroke, (c) that the effect on combustion is smaller in the case where the pilot injection quantity is too low than in the case where it is too high, and (d) that while a complete lack of pilot injection (zero pilot injection quantity) causes a problem, even a slight quantity suffices.

This invention was accomplished on the basis of this knowledge and takes advantage of the fact that the pilot injection quantity of a nozzle is a function of the nozzle's valve-opening pressure and that it is possible to effectively control the injection quantities of a plurality of injection nozzles by monitoring and controlling the injection quantity of one injection nozzle among the plurality of injection nozzles whose valve-opening pressure has been set slightly higher than that of the other nozzles. More specifically, the invention provides a pilot injection control system adapted for use in a fuel injection system which controls a plurality of fuel injection nozzles to conduct pilot injection of fuel into cylinders of an internal combustion engine prior to conducting main injection of fuel into the cylinders, the system comprising a plurality of fuel injection nozzles each equipped with a valve having a specific valve-opening pressure, the valve-opening pressure of at least one of the fuel injection nozzles being set slightly higher than the valve-opening pressures of the other fuel injection nozzles and being designated as a reference nozzle, means for detecting the presence/absence of pilot injection or a quantity corresponding to the pilot injection quantity of the at least one reference nozzle as detected pilot injection information, and means for feedback controlling the pilot injection quantity of the at least one reference nozzle based on the detected pilot injection information.

While any of various mechanisms can be used for conducting the feedback control of the pilot injection quantity, a particularly simple way of achieving the feedback control of the pilot injection is to utilize a fuel injection pump equipped with a prestroke adjustment mechanism and to control the pilot injection quantity by varying the prestroke of the fuel injection pump.

In the pilot injection control system according to this invention, the pilot injection quantity of the fuel injection nozzle having the higher valve-opening pressure (the reference nozzle) is smaller than that of the other fuel injection nozzles. Therefore, by feedback controlling only the reference nozzle to a very small pilot injection quantity it becomes possible to reliably secure pilot injection and prevent the pilot injection quantity from becoming too large even in the other fuel injection nozzles which are not feedback controlled, whereby preferable pilot injection can be obtained in all of the cylinders.

Therefore, since the invention enables stable pilot injection control to be implemented without need for providing a sensor on every fuel injection nozzle, the system according to the invention is of simple configuration and can be constituted at low cost.

BRIEF DESCRIPTION OF THE DRAWINGS

FIG. 7 is a flowchart of the operations for controlling the prestroke in the embodiment of FIG. 1.

DETAILED DESCRIPTION OF THE PREFERRED EMBODIMENT

An embodiment of the pilot injection control system according to the invention will now be described with reference to FIGS. 1 and 7.

Figure 1:
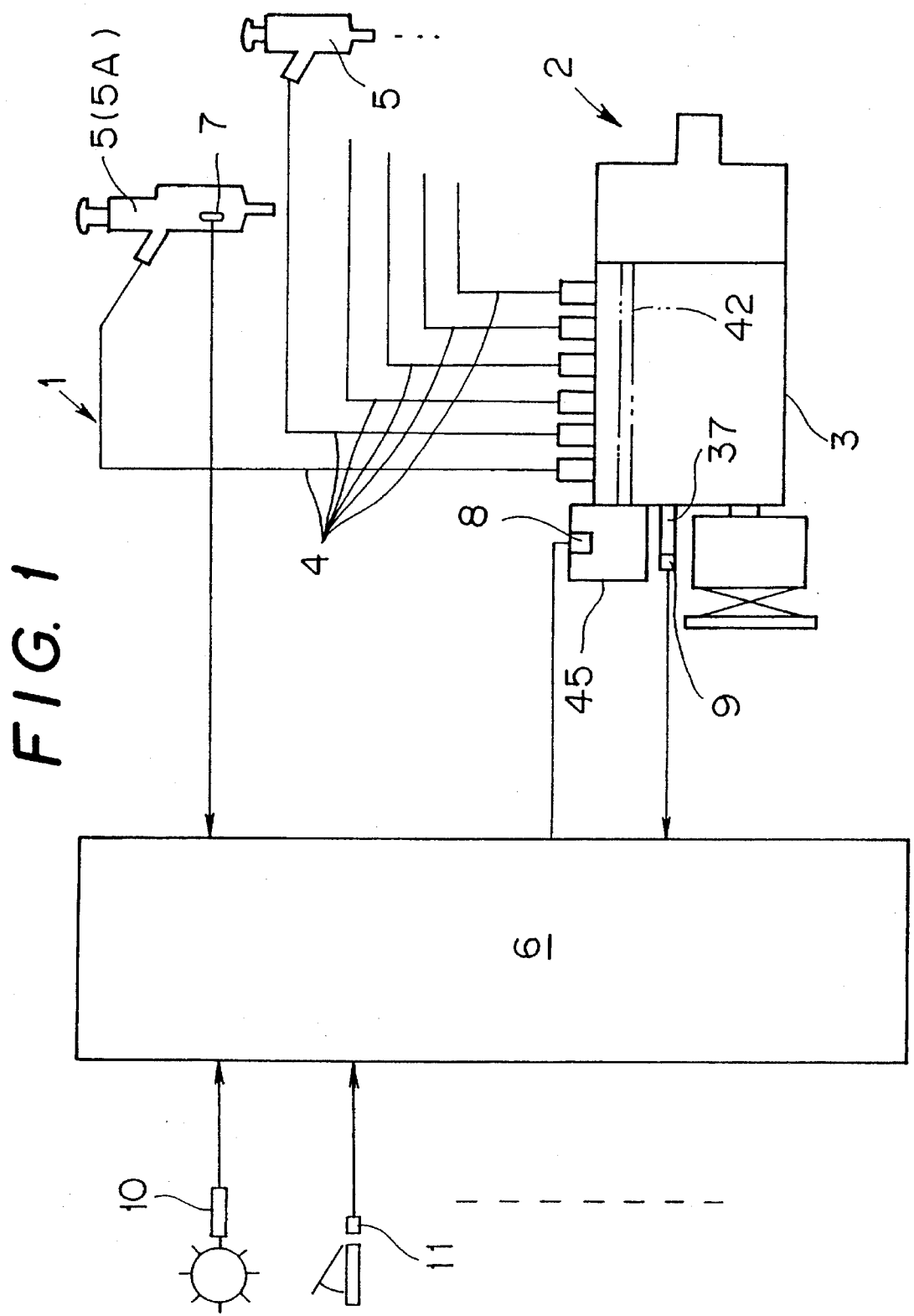
FIG. 1 is an overall schematic view of a fuel injection system 2 equipped with a pilot injection control system 1 that is an embodiment of the invention.

FIG. 1 shows the overall configuration of a fuel injection system 2 equipped with a pilot injection control system 1 according to the invention. The fuel injection system 2 has the pilot injection control system 1, a fuel injection unit 3, a plurality of fuel injection tubes 4, and a plurality of fuel injection nozzles 5.

The pilot injection control system 1 has a central processing unit (CPU) 6 serving as a control means, a pilot injection sensor 7 serving as detection means, a prestroke actuator sensor 8, a rack sensor 9, a rotation sensor 10, and an accelerator sensor 11.

One fuel injection nozzle 5 is provided for each cylinder of the engine. At least one of the fuel injection nozzles 5, for example the uppermost fuel injection nozzle 5 in the figure, is designated as a reference nozzle 5A to be subject to detection and its pressure spring (not shown) is selected so as to adjust its nozzle valve-opening pressure to a slightly higher value than that of the other fuel injection nozzles 5. The pilot injection sensor 7 is provided on the reference nozzle 5A.

In a six-cylinder engine, for example, the valve-opening pressure of only the reference nozzle 5A is set to 207±3 Kg/cm², while that of the other five fuel injection nozzles 5 is set to 200±3 Kg/cm².

The CPU 6 monitors the signal from the pilot injection sensor 7 on the reference nozzle 5A and controls the pilot injection of the reference nozzle 5A based on the monitored signal.

There is no need to provide a pilot injection sensor 7 for each of the engine cylinders and, at a minimum, it suffices to provide one on only the reference nozzle 5A.

The pilot injection sensor 7 can be selected from among various types. While a sensor capable of detecting no more than the presence/absence of pilot injection suffices, it is also possible to use one capable of measuring the pilot injection quantity. The sensor can, for example, be a nozzle needle valve lift sensor of the Hall device type, contact type or piezoelectric type, a combustion chamber pressure sensor or an engine vibration sensor.

The CPU 6 of the pilot injection control system 1 conducts injection feedback control only with respect to the cylinder associated with the reference nozzle 5A whose valve-opening pressure has been set somewhat high.

Since the higher valve-opening pressure of the reference nozzle 5A makes pilot injection least easy to achieve in the cylinder associated with the reference nozzle 5A, controlling the pilot injection quantity in this cylinder to a small value ensures not only that pilot injection will be constantly achieved in the other cylinders but also that the pilot injection quantity will not be too large.

The structure of the fuel injection unit 3 will now be explained in detail with respect to FIGS. 2 and 3.

Figure 2:
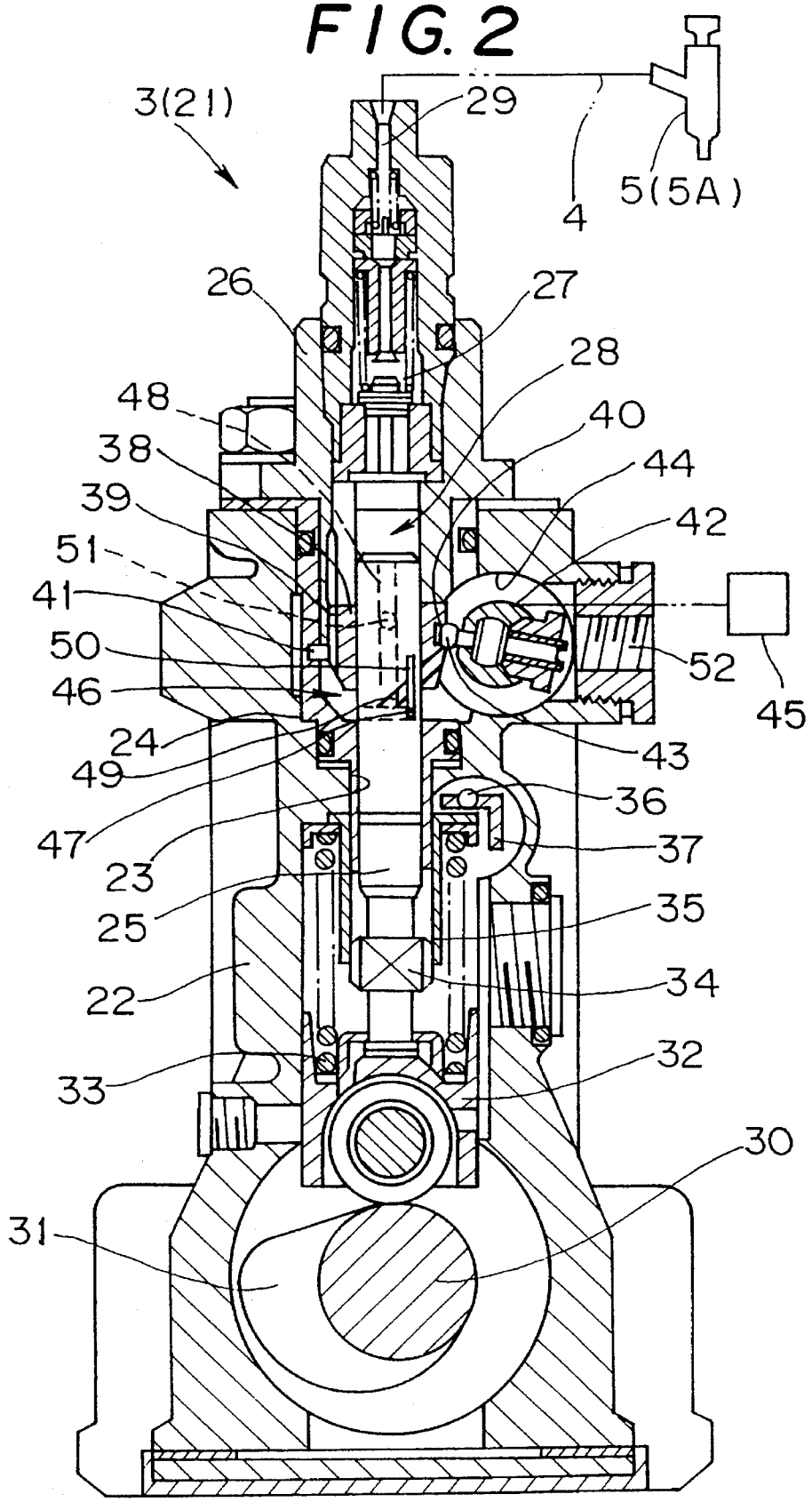
FIG. 2 is a sectional view of a fuel injection pump 21 provided in a fuel injection unit 3 of the embodiment of FIG. 1 and, more specifically, is a sectional view of a fuel injection pump 21 equipped with a prestroke adjustment mechanism.

FIG. 2 shows one of the fuel injection pumps with which the fuel injection unit 3 is equipped. More specifically, it shows a vertical sectional view of a fuel injection pump 21 equipped with a prestroke adjustment mechanism. The fuel injection pumps 21 are formed in a pump housing 22 formed with as many vertical bores 23 as the engine has cylinders. Inside each vertical bore 23, a lower plunger barrel 24 is fitted in and fixed to the pump housing 22 and a plunger 25 is inserted into the plunger barrel 24 to be free to rotate and move up and down therein.

The upper end of the plunger 25 extends into an upper plunger barrel 26 fixed to the pump housing 22 via the lower plunger barrel 24. A delivery valve 27 is disposed inside the upper plunger barrel 26 such that a fuel compression chamber 28 is established between it and the plunger 25. The upper end of the delivery valve 27 is formed with a fuel outlet 29 connected with one of the fuel injection nozzles 5 or the reference nozzle 5A through one of the fuel injection tubes 4.

The lower end of the plunger 25 abuts on a tappet 32 riding on a cam 31 mounted on a camshaft 30. The camshaft 30 is connected with and rotated by the engine. The plunger 25 is maintained in contact with the cam 31 via the tappet 32 by a spring 33 so as to reciprocate vertically as the cam 31 rotates together with the camshaft 30.

The plunger 25 is further formed with a driving face 34 engaged with a sleeve 35 for adjusting the injection quantity. The sleeve 35 is further engaged with a projection 36 which is in turn engaged with a rack 37 for adjusting the injection quantity. The rack 37 is linked with the accelerator pedal (not shown) to be driven normal to the drawing sheet as the accelerator pedal is depressed and released. As a result, the sleeve 35 rotates the plunger 25 in proportion to the amount of accelerator pedal depression.

Thus the effective pressurization stroke for fuel injection can be adjusted by the rotation of the plunger 25 produced by the rack 37.

The rack sensor 9 shown in FIG. 1 is attached to the rack 37.

In addition, a control sleeve 38 is fitted over the upper end of the plunger 25 to be slidable thereon. The control sleeve 38 is formed on its left side in FIG. 2 with a vertical guide groove 39 and on its right side in the same drawing with a lateral engagement groove 40. A guide pin 41 formed on the lower plunger barrel 24 is fitted into the guide groove 39 and the engagement member 43 of a timing control rod 42 is fitted into the engagement groove 40.

The timing control rod 42 is rotatably supported within a lateral bore 44 of the pump housing 22 by bearings (not shown).

The prestroke can be adjusted by rotating the timing control rod 42 so as to raise and lower the control sleeve 38.

More specifically, rotating the timing control rod 42 clockwise (forward) or counterclockwise (backward) as seen in FIG. 2 causes the engagement member 43 of the timing control rod 42 to rotate together therewith. This rotation of the engagement member 43 moves the control sleeve 38 vertically, thus changing the relative vertical positional relationship between the plunger 25 and the control sleeve 38.

As a result, the prestroke of the plunger 25, i.e. the distance between the control sleeve 38 and the position of a suction and discharge hole 47 (explained later) when the plunger 25 is at its bottom dead point, can be adjusted.

More specifically, the distance traveled by the plunger 25 between its the bottom dead point and the point at which the suction and discharge hole 47 is closed is the plunger 25 prestroke and the time that the suction and discharge hole 47 is closed marks the start of the main fuel injection.

When the timing control rod 42 is rotated clockwise to raise the control sleeve 38, the prestroke becomes greater and the start of the main fuel injection is delayed (injection retard). This makes it possible to obtain a high injection rate (fuel injection quantity per unit rotation angle of the camshaft 30, namely the rate of change in the injection quantity with time) suitable for the low engine speed range.

When the timing control rod 42 is rotated counterclockwise, on the other hand, the control sleeve 38 moves down to shorten the prestroke. The injection thus occurs earlier (injection advance) so that a lower injection rate suitable for the high engine speed range is obtained. However, the absolute injection quantity increases.

The timing control rod 42 is connected with a prestroke actuator 45 for-rotating it. The prestroke actuator 45, which may be a step motor or the like, has the prestroke actuator sensor 8 attached thereto (see FIG. 1).

The plunger 25 slidably accommodated in the lower plunger barrel 24 is moved reciprocally within the lower plunger barrel 24 and the upper plunger barrel 26 by the rotation of the engine applied thereto through the camshaft 30 and the cam 31. As a result, fuel is drawn into the fuel compression chamber 28 from a fuel reservoir 46 and is then forced out of the fuel outlet 29 and through the associated fuel injection tube 4 to the associated fuel injection nozzle 5 or 5A to be injected into the associated cylinder.

More specifically, the plunger 25 has the fuel suction and discharge hole 47 which extends radially and constitutes a fuel suction port opening into the fuel reservoir 46, a central communicating hole 48 formed axially at its center so as to communicate the fuel suction and discharge hole 47 with the fuel compression chamber 28, an inclined control groove 49 formed in its outer surface, and a vertical groove 50 for communicating the inclined control groove 49 with the opening of the fuel suction and discharge hole 47.

In addition, the control sleeve 38 slidably fitted on the plunger 25 is formed with a main injection cutoff port 51 which passes radially therethrough.

The main injection cutoff port 51 is disposed at a position in the vertical direction which enables it to communicate with the inclined control groove 49 depending on the up and down movement of the plunger 25.

The fuel reservoir 46 communicates with a fuel inlet 52 through the lateral bore 44 formed in the pump housing 22.

Figure 3:
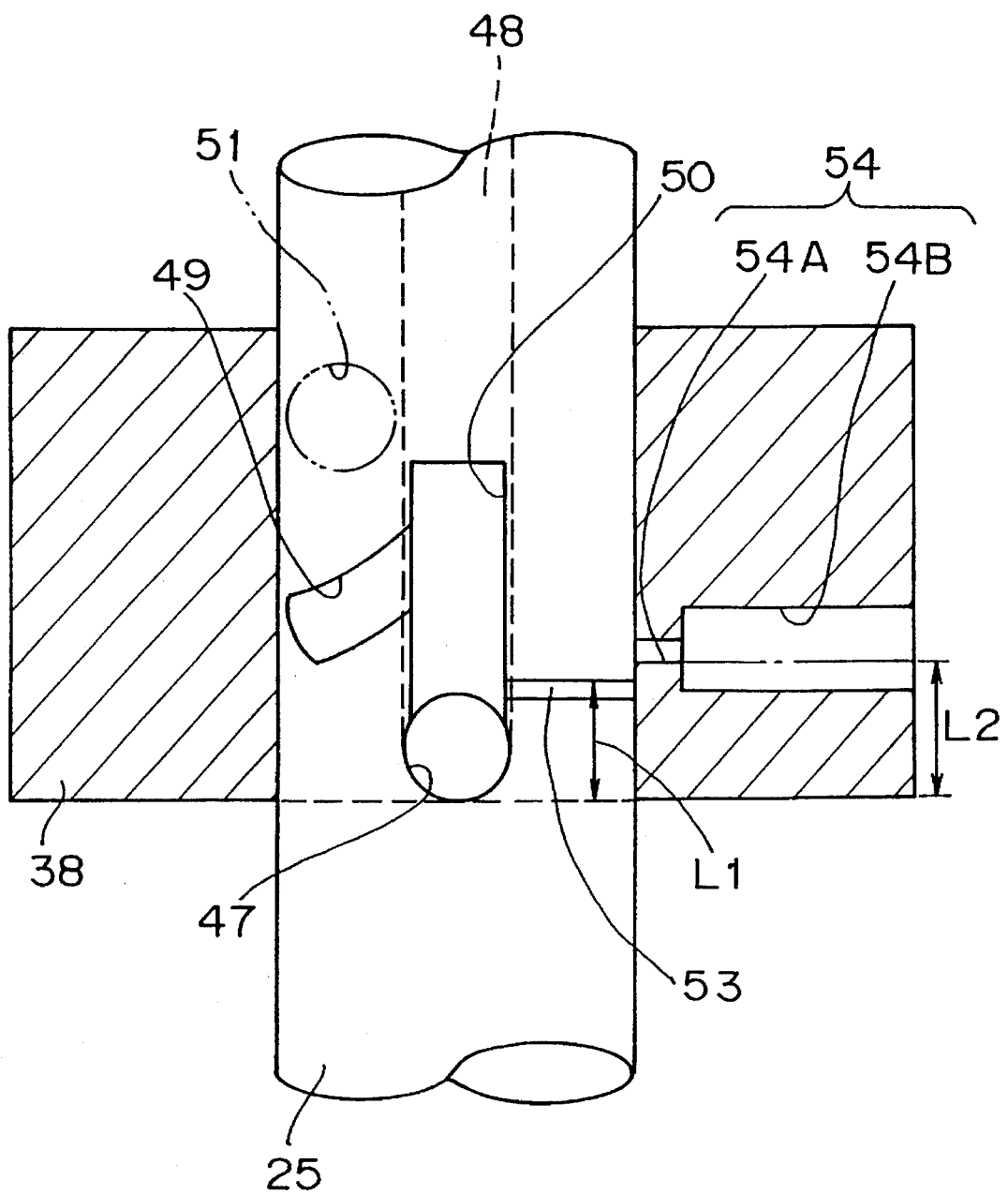
FIG. 3 is an enlarged vertical sectional view of an essential portion of the embodiment of FIG. 1 for showing the state at the start of pilot injection.

While the inclined control groove 49 is provided on the plunger 25 and the cutoff port 51 is provided on the control sleeve 38 for use main injection, in addition, as shown in the enlarged view of FIG. 3, the plunger 25 is further formed with a spill slit 53 and the control sleeve 38 is further formed with a cutoff port 54 for use in pilot injection.

The pilot spill slit 53 is formed to a prescribed length laterally across the outer surface of the plunger 25 on the side of the suction and discharge hole 47 and the vertical groove 50 opposite from the side on which the inclined control groove 49 is formed and so as to communicate with the suction and discharge hole 47 of the plunger 25.

The pilot injection cutoff port 54 is formed in the control sleeve 38 at a position corresponding to the position of the pilot spill slit 53 in the axial direction of the plunger 25.

The pilot injection cutoff port 54 consists of a small-diameter portion 54A and a large-diameter portion 54B and is formed at a lower part of the control sleeve 38 than the main injection cutoff port 51.

The operation of the so-configured fuel injection pump 21 will now be briefly explained.

Shortly after the plunger 25 begins its rise from the bottom dead point, the suction and discharge hole 47 becomes open to the fuel reservoir 46. Since the fuel reservoir 46 and the fuel compression chamber 28 are in communication through the suction and discharge hole 47 and the central communicating hole 48, the pressure of the fuel in the fuel compression chamber 28 does not increase and, therefore, the delivery valve 27 remains closed.

FIG. 3 shows the situation at the start of pilot injection during the actual delivery of fuel. Here the plunger 25 has risen to the point where the suction and discharge hole 47 is closed by the lower portion of the control sleeve 38. As a result, the pressure of the fuel in the fuel compression chamber 28 rises until it reaches a level higher than the valve-opening pressure of the delivery valve 27, at which time the delivery valve 27 opens. The fuel therefore issues from the fuel outlet 29 and is delivered at high pressure to the associated fuel injection nozzle 5 or 5A. This marks the start of pilot injection.

With further rise of the plunger 25, the pilot spill slit 53 comes into communication with the small-diameter portion 54A of the pilot injection cutoff port 54 of the control sleeve 38, whereby the fuel in the fuel compression chamber 28 spills into the fuel reservoir 46 to terminate the pilot injection.

Then, as the plunger 25 continues to rise, the communication of the pilot spill slit 53 with the small-diameter portion 54A of the pilot injection cutoff port 54 is closed off, once again sealing the fuel compression chamber 28. This marks the start of main injection.

The main injection is thereafter terminated when the inclined control groove 49 aligns with the cutoff port 51.

More specifically, with further rise of the plunger 25 the inclined control groove 49 that was in communication with the suction and discharge hole 47 comes into communication with the main injection cutoff port 51 of the control sleeve 38, thus bringing the cutoff port 51 in communication with the fuel compression chamber 28 via the inclined control groove 49, the vertical groove 50, the suction and discharge hole 47 and the central communicating hole 48. As a result, the fuel in the fuel compression chamber 28 escapes to the fuel reservoir 46, lowering the fuel pressure in the fuel compression chamber 28 to the point where the delivery valve 27 closes to terminate the injection (the delivery of pressurized fuel).

Then when the plunger 25 descends, fuel is sucked from the fuel reservoir 46 into the fuel compression chamber 28 owing to the negative pressure in the fuel compression chamber 28.

In addition, the timing control rod 42 can be rotated in either direction by the prestroke actuator 45 to raise and lower the control sleeve 38 for adjusting the prestroke, i.e, the fuel injection timing.

The factors determining the pilot injection quantity or the pilot stroke are the distance L1 between lower edge of the suction and discharge hole 47 of the plunger 25 and the upper edge of the pilot spill slit 53 and the distance L2 between the lower edge of the control sleeve 38 and the lower edge of the small-diameter portion 54A of the pilot injection cutoff port 54, the pilot stroke being equal to (L2–L1).

It is therefore possible to adjust the pilot stroke (L2–L1) by operating the timing control rod 42 for raising and lowering the control sleeve 38 with respect to the plunger 25.

Figure 4:
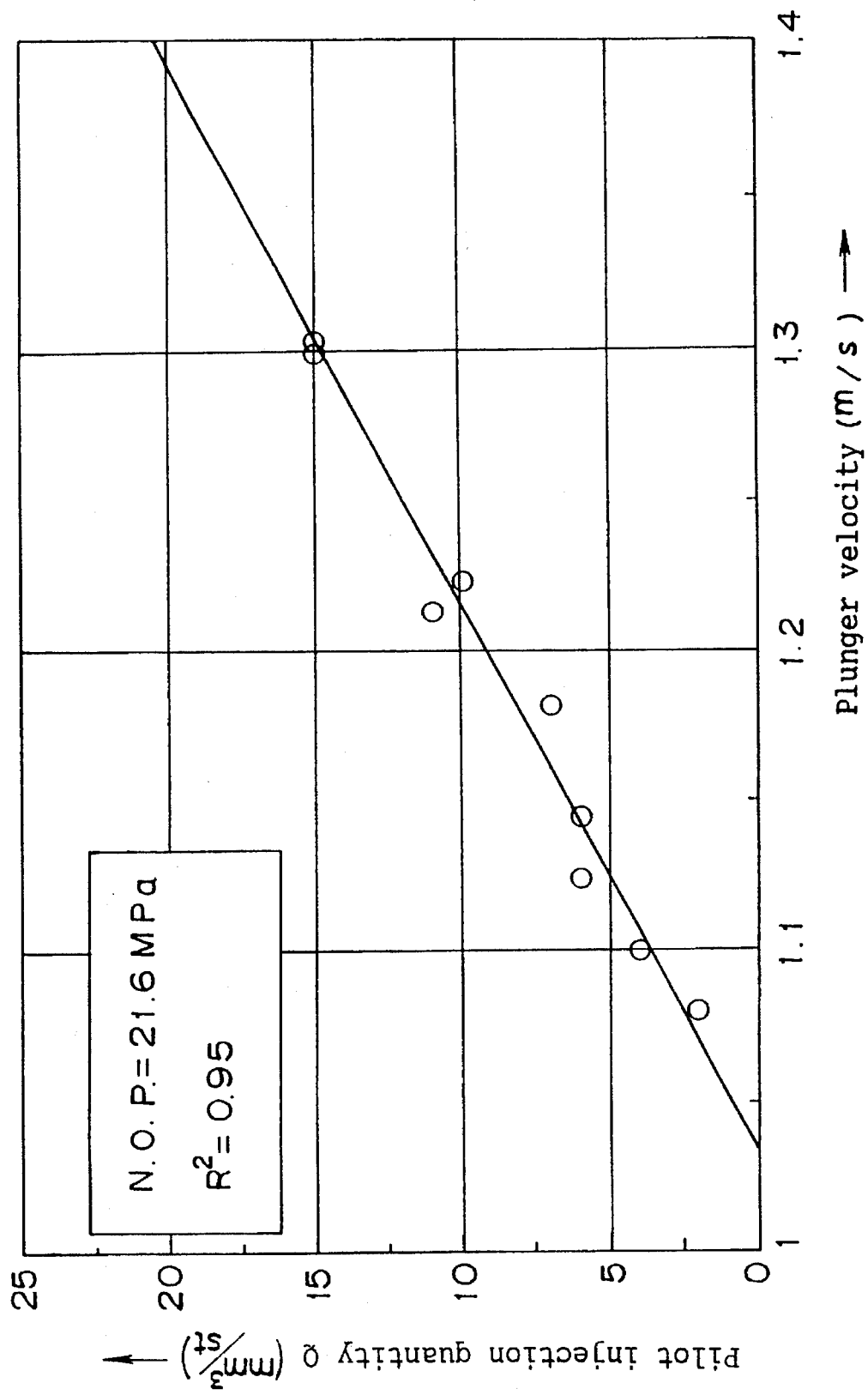
FIG. 4 is a graph showing how the pilot injection quantity Q of the embodiment of FIG. 1 varies with the velocity of the plunger 25 of the fuel injection pump.

A specific example of the pilot injection control operation is shown in the graph of FIG. 4. As will be noted, the pilot injection quantity Q varies linearly with the plunger velocity.

The velocity of the plunger 25 differs depending on the angular position to which the cam 31 serving to control the effective injection stroke has been rotated by the camshaft 30.

Moreover, since the prestroke determined by the angular position of the cam 31 differs depending on the vertical position of the control sleeve 38, the pilot injection quantity Q can be adjusted by moving the control sleeve 38 up and down to adjust the prestroke.

Figure 5:
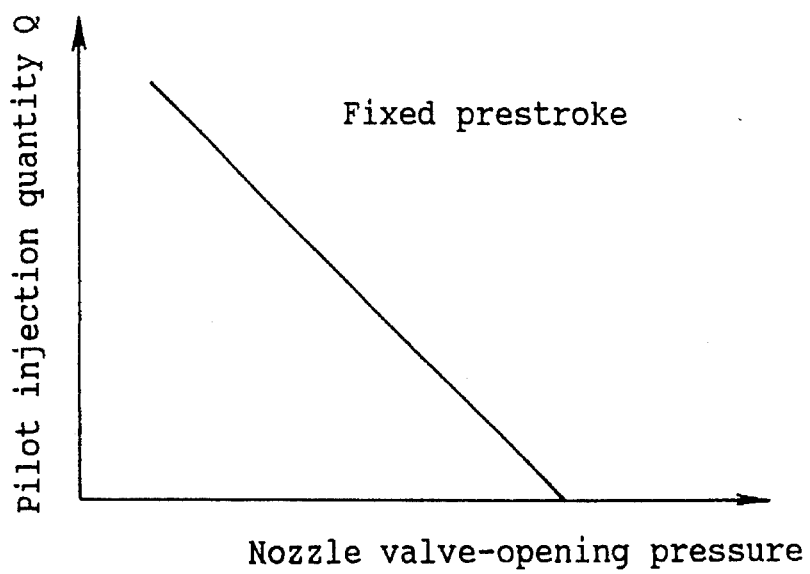
FIG. 5 is a graph showing how the pilot injection quantity Q of the embodiment of FIG. 1 varies with the nozzle valve-opening pressure at a fixed prestroke.
Figure 6:
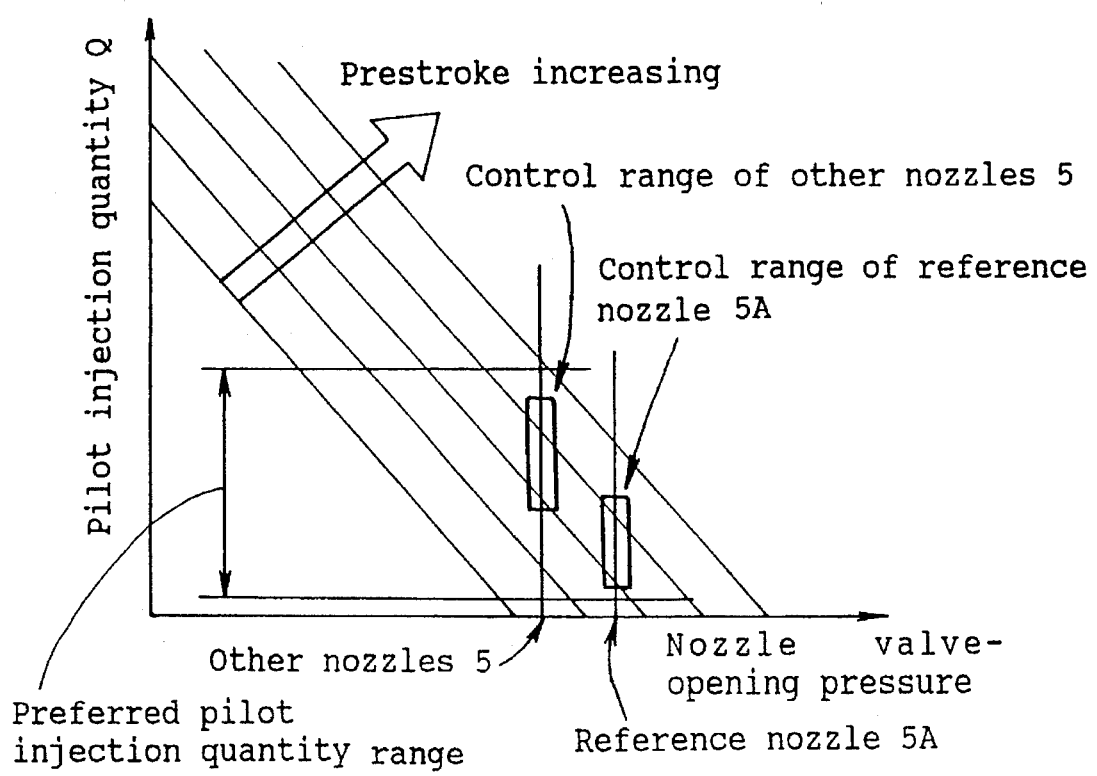
FIG. 6 is a graph showing how the pilot injection quantity Q of the embodiment of FIG. 1 varies with nozzle valve-opening pressure at different prestrokes.

As shown in FIG. 5, for a fixed prestroke the pilot injection quantity Q decreases linearly with increasing nozzle valve-opening pressure and, as shown in FIG. 6, the pilot injection quantity Q is controlled utilizing the fact that the pilot injection quantity Q increases with increasing prestroke.

Since the nozzle valve-opening pressure of the reference nozzle 5A is set to be slightly higher than that of the other fuel injection nozzles 5, controlling the prestroke such that pilot injection quantity of the reference nozzle 5A falls within a prescribed range automatically enables the pilot injection quantities of the other fuel injection nozzles 5 at the same prestroke to be controlled to within a slightly higher range than that of the reference nozzle 5A.

FIG. 7 is a flowchart of the prestroke control operations. The control routine starts with step S1 in which operating conditions such as the engine speed and the engine load are read in from the rotation sensor 10, the accelerator sensor 11 etc.

In the following step S2, a target prestroke (Ps.soll) appropriate for the read-in conditions is read from a prestroke map stored in the CPU 6. The prestroke map consists of prestrokes determined to produce appropriate pilot injection quantities Q in response to specific engine speed and load conditions.

In step S3, the CPU 6 sends a signal (Ps.soll+Ps.con) representing a prestroke control amount to the prestroke actuator 45 which, in response, raises or lowers the control sleeve 38 for establishing an appropriate prestroke. (Ps.con is a control correction value.)

In step S4, a judgment is made as to whether or not the pilot injection quantity Q is appropriate and if it is not, control passes to step S5 in which a judgment is made as to whether the pilot injection quantity Q is too large. If it is, Ps.con is replaced with (Ps.con−ΔPs) in step S6 and if it is not, Ps.con is replaced with (Ps.con− ΔPs) in step S7. (ΔPs is a minute value for adjusting the control correction value Ps.con.)

The aforesaid control operations are repeated for controlling the pilot injection quantity Q of the reference nozzle 5A to not greater than a prescribed value.

From the explanation given earlier it is obvious that if the pilot injection quantity Q of the reference nozzle 5A is not greater than a prescribed value, the pilot injection quantities Q of the other fuel injection nozzles 5 will necessarily be equal to or greater than the prescribed value. Therefore, if the state of pilot injection by the reference nozzle 5A is monitored and controlled, no particular need arises for monitoring or controlling the other fuel injection nozzles 5.

The foregoing embodiment was explained with respect to the case where the pilot injection quantity is controlled by adjusting the prestroke. The invention is not limited to the use of a mechanism for adjusting prestroke, however, but is able instead to utilize any of various other control mechanisms capable of adjusting to within an appropriate range the pilot injection quantity of a fuel injection nozzle whose valve-opening pressure has been set slightly higher than that of the other fuel injection nozzles, As will be understood from the foregoing description, the invention sets the valve-opening pressure of at least one fuel injection nozzle higher than that of the other fuel injection nozzles and monitors and controls the pilot injection at the cylinder(s) associated with the fuel injection nozzle(s) having the higher valve-opening pressure. Since this arrangement eliminates the need to monitor and control the pilot injection at all of the fuel injection nozzles, it enables stable pilot injection with a low-cost system.

What is claimed is:

1. A pilot injection control system adapted for use in a fuel injection system which controls a plurality of fuel injection nozzles to conduct pilot injection of fuel into cylinders of an internal combustion engine prior to conducting main injection of fuel into the cylinders, the system comprising:

a plurality of fuel injection nozzles each equipped with a valve having a specific valve-opening pressure, the valve-opening pressure of at least one of the fuel injection nozzles being set slightly higher than the valve-opening pressures of the other fuel injection nozzles and being designated as a reference nozzle, means for detecting presence/absence of pilot injection or a quantity corresponding to a pilot injection quantity of the at least one reference nozzle as detected pilot injection information, and means for feedback controlling the pilot injection quantity of the at least one reference nozzle based on the detected pilot injection information.

2. A pilot injection control system according to claim 1, wherein the pilot injection quantity of the reference nozzle is set slightly smaller than that of the other fuel injection nozzles.

3. A pilot injection control system according to claim 1, wherein the pilot injection quantities of the other fuel injection nozzles are not feedback controlled.

4. A pilot injection control system according to claim 1, wherein the detection means is a pilot injection quantity sensor.

5. A pilot injection control system according to claim 1, wherein the control means comprises a memory and uses a target control value retrieved from a control value map stored in the memory beforehand to conduct the feedback control based on the detected pilot injection information.

6. A pilot injection control system according to claim 1, wherein the fuel injection system comprises a plurality of fuel injection pumps equipped with prestroke adjustment mechanisms.

7. A pilot injection control system according to claim 6, wherein the control means adjusts the prestroke of the fuel injection pumps equipped with prestroke adjustment mechanisms.

8. A pilot injection control system according to claim 6, wherein the control means comprises a memory and uses a target prestroke retrieved from a prestroke map stored in the memory beforehand to conduct the feedback control based on the detected pilot injection information.

9. A pilot injection control system according to claim 8, further comprising a rotation sensor for detecting engine speed and an accelerator sensor for detecting engine load, the control means using the detected engine speed and load as address data for retrieving from the prestroke map a target prestroke providing a pilot injection quantity appropriate for the detected engine speed and load.

10. A pilot injection control system according to claim 9, further comprising a prestroke actuator for operating the prestroke adjustment mechanism, the control means conducting the feedback control of the prestroke by retrieving a target prestroke from the prestroke map, outputting a prestroke control quantity signal based on the retrieved target prestroke to the prestroke actuator, determining the pilot injection quantity from the output of the detection means, and outputting a minute value for adjusting a prestroke control correction value to the prestroke actuator.

11. A pilot injection control system according to claim 6, wherein each fuel injection pump with prestroke adjustment mechanism comprises a plunger driven by the engine to reciprocate vertically and a control sleeve slidably fitted on the plunger, the prestroke being adjusted to control the pilot injection quantity by varying the position of the control sleeve relative to the vertical length of the plunger.

12. A pilot injection control system according to claim 11, wherein the fuel injection pumps with prestroke adjustment mechanisms comprise an injection quantity adjustment rack for rotating the plungers, a rack sensor associated with the injection quantity adjustment rack, a prestroke actuator for varying the position of the control sleeves relative to the vertical length of the plungers, and a prestroke actuator sensor associated with the prestroke actuator, the detection signals of the rack sensor and the prestroke actuator sensor being input to the control means.

13. A pilot injection control system according to claim 11, wherein each plunger is formed with an inclined control groove and a pilot spill slit and each control sleeve is formed with a main injection cutoff port and a pilot injection cutoff port, the inclined control groove coming into alignment with the main injection cutoff port and the pilot spill slit coming into alignment with the pilot injection cutoff port during rise of the plunger.

14. A pilot injection control system according to claim 13, wherein the plunger is provided with a suction and discharge hole communicating with the inclined control groove and the pilot stroke is equal to (L2–L1) where L1 is the distance between the bottom edge of the suction and discharge hole and the top edge of the pilot injection cutoff port and L2 is the distance between the bottom edge of the control sleeve and the bottom edge of the pilot injection cutoff port.

* * * * *